(12) United States Patent
Schulze

(10) Patent No.: US 10,934,185 B2
(45) Date of Patent: Mar. 2, 2021

(54) WATER TREATMENT UNIT

(71) Applicant: Hydrotec International Water Treatment Ltd., Swords (IE)

(72) Inventor: Wolfgang Schulze, Schwarzenbach/Saale (DE)

(*) Notice: Subject to any disclaimer, the term of this patent is extended or adjusted under 35 U.S.C. 154(b) by 57 days.

(21) Appl. No.: 16/297,896

(22) Filed: Mar. 11, 2019

(65) Prior Publication Data
US 2019/0284067 A1 Sep. 19, 2019

(30) Foreign Application Priority Data

Mar. 15, 2018 (EP) .................... 18161880

(51) Int. Cl.
| | | |
|---|---|---|
| *C02F 1/48* | (2006.01) | |
| *C02F 1/34* | (2006.01) | |
| *C02F 5/02* | (2006.01) | |
| *C02F 1/20* | (2006.01) | |

(52) U.S. Cl.
CPC .............. *C02F 1/48* (2013.01); *C02F 1/34* (2013.01); *C02F 1/484* (2013.01); *C02F 1/20* (2013.01); *C02F 5/02* (2013.01); *C02F 2201/002* (2013.01); *C02F 2201/004* (2013.01); *C02F 2201/483* (2013.01); *C02F 2209/40* (2013.01); *C02F 2301/022* (2013.01); *C02F 2301/024* (2013.01); *C02F 2303/22* (2013.01)

(58) Field of Classification Search
CPC ...... C02F 1/46; C02F 1/32; C02F 5/08; C02F 1/484; C02F 1/48; C02F 1/34; C02F 2209/40; C02F 1/20; C02F 2201/002; C02F 2201/004; C02F 2201/483; C02F 2301/024; C02F 2303/22; C02F 2301/022; C02F 5/02

See application file for complete search history.

(56) References Cited

U.S. PATENT DOCUMENTS

| | | | |
|---|---|---|---|
| 4,485,012 A | 11/1984 | Ehresmann | |
| 4,818,395 A * | 4/1989 | Schulze | .................. C02F 1/484 210/222 |

FOREIGN PATENT DOCUMENTS

| | | |
|---|---|---|
| EP | 0525835 A2 | 2/1993 |
| GB | 1038330 A | 8/1966 |
| WO | WO88/097773 A1 | 12/1988 |

* cited by examiner

*Primary Examiner* — Cameron J Allen
(74) *Attorney, Agent, or Firm* — Welsh Flaxman & Gitler LLC

(57) ABSTRACT

A water treatment unit with a housing having a housing interior and an oscillation unit mounted so as to oscillate in the housing interior. The oscillation unit can be set in oscillation by a coil through which an electrical alternating signal flows, wherein a water inlet and a water outlet are provided on the housing, and wherein a flow area is formed between the inner wall of the housing that delimits the housing interior and the oscillation unit, the flow area being designed such that water flowing from the water inlet to the water outlet flows around the oscillation unit.

14 Claims, 3 Drawing Sheets

WATER TREATMENT UNIT

BACKGROUND OF THE INVENTION

The invention relates to a water treatment unit and a method for treating water with such a water treatment unit.

Water treatment units for chemical-free water treatment are generally known. In such units, particles (in particular microparticles) of calcium carbonate are formed from constituents present in the water. This can effectively reduce the calcification and/or formation of scale on devices in a water circuit, in particular a hot water circuit.

European patent application No. EP 0 525 835 A2 discloses a device for removing scale in which the water treatment is affected by a magnetic field generated by a coil. One or more deflection plates are provided inside a housing and force the water to be deflected several times as it flows through the housing.

SUMMARY OF THE INVENTION

On this basis, it is the object of the invention to provide a water treatment unit that allows effective water treatment.

According to a first aspect, the invention relates to a water treatment unit. The water treatment unit comprises a housing with a housing interior and an oscillation unit mounted so as to oscillate in the housing interior. The oscillation unit can be set in oscillation by a coil through which an electrical alternating signal flows. A water inlet and a water outlet are provided on the housing. A flow area is formed between the inner wall of the housing that delimits the housing interior and the oscillation unit and is designed in such a way that water flowing from the water inlet to the water outlet flows around the oscillation unit.

The water treatment unit according to the invention offers the decisive advantage that the effect of the magnetic field on the water is decisively improved by the mechanical influence of the oscillation unit on the water.

According to one embodiment, the flow area has a first flow area section adjoining the water inlet in the direction of flow and a second flow area section arranged upstream of the water outlet in the direction of flow. The flow cross-section of the second flow area section is, at least in some sections, larger than the flow cross-section of the first flow area section. The differences in the flow cross-section between the first and second flow area sections can be affected by correspondingly shaping the oscillation unit and/or by shaping the inner wall of the housing. A reduction in the flow cross-section downstream of the water inlet has the advantage that the flow rate of the water is increased and thus a suction or turbulence is generated in the water. This advantageously leads to an outgassing of $CO_2$ and thus to a shift in the lime-carbonic acid equilibrium. This shift has beneficial effects on the production of calcium carbonate microcrystals.

According to one embodiment, the oscillation unit has projections protruding beyond opposite sides with respect to a central plane of the oscillation unit, the flow cross-sectional tapering of the flow area that is caused by a first projection facing the water inlet being greater than the flow cross-sectional tapering that is caused by the second projection facing the water outlet. The desired design of the flow cross-section in the flow area of the water is thus achieved by shaping the oscillation unit accordingly. If necessary, this can also be supported by correspondingly shaping the inner wall of the housing.

According to one embodiment, the first and second projections comprise a hump-like or hilly shape with a rounded tip. This ensures an advantageous deflection of the water by the oscillation unit and thus a specific flow around the oscillation unit.

According to one embodiment, the height of the first projection that is measured from the center plane of the oscillation unit is greater than the height of the second projection that is measured from the center plane of the oscillation unit. In other words, the oscillation unit is not symmetrical with respect to the oscillation unit center plane since the first projection protrudes more strongly than the second projection. As a result, the greater flow cross-sectional tapering described above can be achieved directly downstream of the water inlet.

According to one embodiment, the material of the oscillation unit has a lower density than the material of the housing. The housing is preferably made of cast iron (especially GG25) and the oscillation unit has a lower density than cast iron. As a result, the technical requirements for the bearing of the oscillation unit can be lower and the bearing is subject to less wear. However, it is understood that the oscillation unit must have ferromagnetic properties in order to be set in mechanical oscillation by the coil.

According to one embodiment, the oscillation unit is made of a ferromagnetic plastic material. Thus, a oscillation unit with relatively low mass can be achieved.

According to one embodiment, the oscillation unit is mounted so as to oscillate in a direction perpendicular to the center plane of the oscillation unit in order to perform a oscillation movement. This allows the oscillation unit to move towards or away from the water inlet or water outlet.

According to one embodiment, the oscillation unit is mounted in oscillating fashion by a spring element and/or an elastomer. A magnetic short circuit between the housing and the oscillation unit is effectively prevented in advantageous manner by the bearing, the use of stainless steel springs or an elastomer material as bearing elements being preferred here.

According to one embodiment, the oscillation unit is mounted so as to oscillate by means of asymmetrical bearing elements. As a result, the bearing can influence the oscillation behavior of the oscillation unit in a well-calculated manner. For example, the bearing elements can be selected in such a way that the oscillation unit can perform a smaller oscillation stroke in the direction of the water inlet than in the direction of the water outlet. This effectively prevents the oscillation unit from hitting the housing due to the smaller flow cross-section on the inlet side.

A sensor for monitoring the oscillation of the oscillation unit is provided according to one embodiment. In particular, the sensor can be a oscillation sensor which can be used to detect mechanical oscillations. This allows the function of the water treatment unit to be monitored.

According to one embodiment, the sensor is provided on the housing and designed for contactless oscillation monitoring of the oscillation unit. "Contactless oscillation monitoring" here means in particular that the sensor is arranged at a distance from the oscillation unit and that the oscillations of the oscillation unit can only be detected indirectly via oscillations on the housing. This allows a technically simple oscillation monitoring to be achieved.

According to one embodiment, the sensor is coupled to an evaluation unit which is designed to evaluate the oscillation behavior and/or the oscillation frequency of the oscillation unit. The evaluation unit can be used to evaluate the measurement signal provided by the sensor to determine whether or not the oscillation unit performs mechanical oscillations in the desired frequency range or according to a predefined desired oscillation behavior. This allows conclusions to be drawn about the correct function of the water treatment unit.

According to one embodiment, the evaluation unit is designed to determine whether the oscillation frequency of the oscillation unit lies within or outside a desired range of the oscillation frequency, whether the oscillation unit does not oscillate and/or whether the oscillation behavior of the oscillation unit corresponds to a target desired oscillation behavior. Thus, indications of possible error causes can be derived on the basis of the information provided by the evaluation unit.

According to a further aspect, the invention relates to a method for treating water by means of a water treatment unit. The water treatment unit has a housing with an oscillation unit mounted so as to oscillate in the housing interior and a coil. The method comprises the following steps:

Applying an alternating electrical signal to the coil, thus causing the oscillation unit to oscillate mechanically;
passing water through the housing interior of the water treatment unit such that the water flows around the oscillation unit; and
precipitating calcium carbonate from the water by the effect of the oscillation unit on the water.

The term "flow around the oscillation unit" in the sense of the present invention means that the water cannot flow through the oscillation unit but is deflected by the surface of the oscillation unit and thus passes the oscillation unit on the outside in a flow area between the housing and the oscillation unit.

For the purposes of the present invention, "calcium carbonate microcrystals" or "calcium carbonate particles" means any particles consisting of calcium carbonate or containing at least a proportion of calcium carbonate.

The expressions "approximately", "substantially" or "about" in the sense of the invention mean deviations from the respectively exact value by +/−10%, preferably by +/−5%, and/or deviations in the form of changes that are insignificant for the function.

Developments, advantages and possible uses of the invention also result from the following description of embodiments and from the drawings. All features described and/or depicted are here, in themselves or in any combination, as a matter of principle, the subject matter of the invention, irrespective of their combination in the claims or their back-reference. The content of the claims is also made part of the description.

BRIEF DESCRIPTION OF THE DRAWINGS

The invention will be explained in more detail below by means of embodiments using the drawings, wherein.

DETAILED DESCRIPTION OF THE INVENTION

Figure 1:
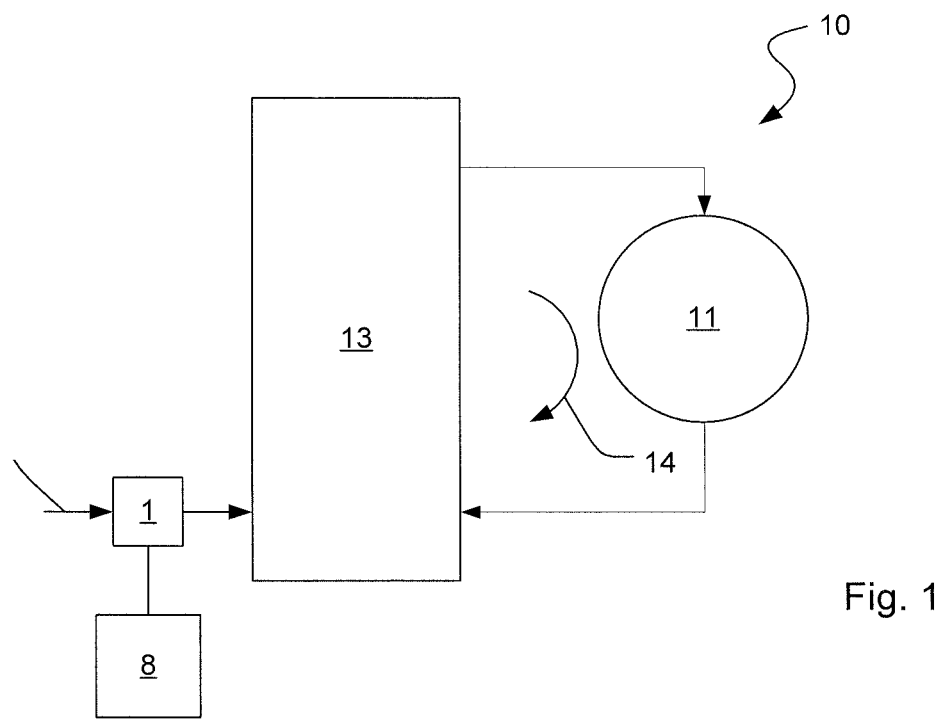
FIG. 1 shows, by way of example, a schematic diagram of a system with a water treatment unit in a first embodiment.
Figure 2:
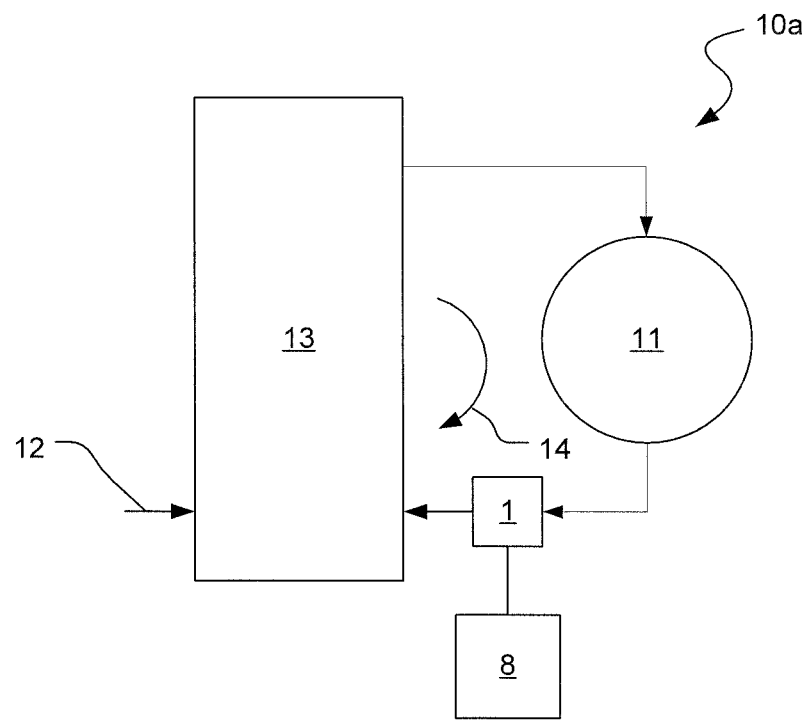
FIG. 2 shows, by way of example, a schematic diagram of a system with a water treatment unit in a second embodiment.

FIGS. 1 and 2 show a rough diagram of two installation situations of a water treatment unit 1 in a system 10 for providing hot water for a consumer 11. It is understood that the water treatment unit 1 is not limited to the use in such a system but can also be used for water treatment in different systems.

In FIG. 1, water, in particular cold water, is supplied to a water treatment unit 1 via an inlet 12. After passing through the water treatment unit 1 and precipitating calcium carbonate (decarbonization) therein, the water is supplied to a water heater 13. The water is heated in this water heater 13. The heated water can then be supplied to a consumer 11 as required. The consumer can, for example, be provided in a hot water circulation 14, i.e. even if no hot water is consumed by the consumer 11, the hot water circulates, as indicated by the arrow with the reference sign 14.

FIG. 2 shows a system 10a similar to the system 10 described above. The main difference is that the water treatment unit 1 is not provided in the area of the inlet 12, but is integrated into the hot water circulation 14. In the illustrated embodiment, the water treatment unit 1 is arranged in the hot water return flow between consumer 11 and the hot water heater 13. Alternatively, it would also be possible to arrange the water treatment unit 1 in the hot water flow between the hot water heater 13 and the consumer 11.

The system 10, 10a additionally has an evaluation unit 8, by means of which the function of the water treatment unit 1 can be checked. The function of the evaluation unit 8 is explained in more detail below.

Figure 3:
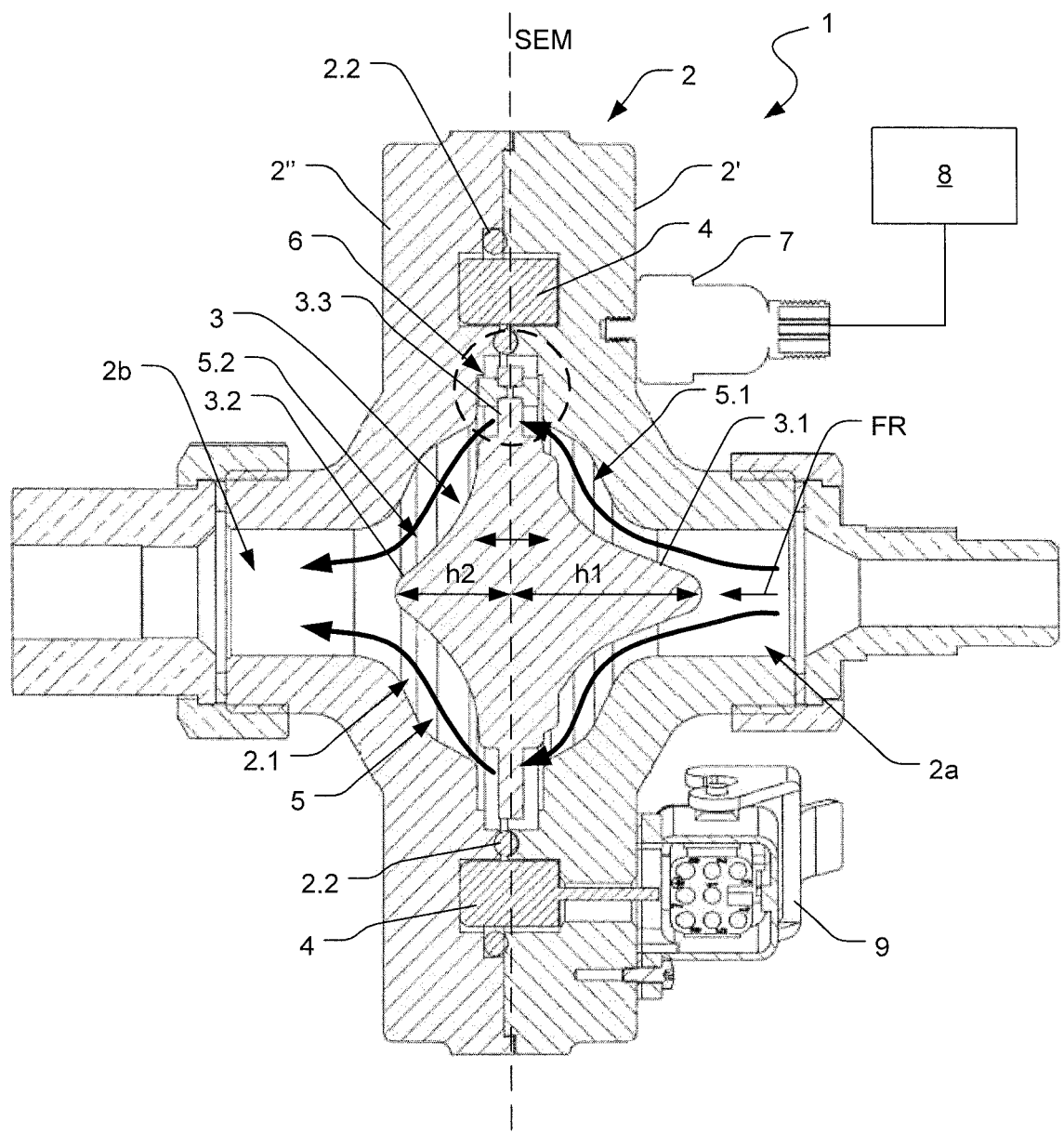
FIG. 3 shows, by way of example, an embodiment of a water treatment unit in a sectional view.

FIG. 3 shows a sectional view of the water treatment unit 1. The water treatment unit 1 comprises a housing 2. In the illustrated embodiment, the housing 2 consists of two housing parts 2', 2", which are connected to each other in a fluid-tight manner by means of seals 2.2 in order to delimit a housing interior 2.1 in a fluid-tight fashion to the outside. The housing part 2' has a connection area which forms a water inlet 2a. Similarly, the housing part 2" also has a connection area which forms a water outlet 2b. The water inlet 2a and the water outlet 2b are arranged on opposite sides of housing 2.

The housing parts 2', 2", for example, are designed as plates or bowls. The housing interior 2.1 widens from the water inlet 2a to the middle of the housing and then tapers increasingly in the direction of the water outlet 2b. In other words, the diameter or clear width of the housing interior increases from the water inlet 2a to the housing center and then decreases again from the housing center towards the water outlet 2b.

An oscillation unit 3 is provided in the housing interior 2.1. This oscillation unit 3 is mounted via a bearing 6 in such a way that it oscillates between the housing parts 2', 2". In particular, the oscillation bearing is such that the oscillation unit 3 can move perpendicular to a oscillation unit center plane SEM, as shown by the double arrow in FIG. 3. In other words, the oscillation unit 3 is movably received in the housing 2 in such a way that it can at least slightly change its spatial position between the water inlet 2a and the water outlet 2b.

The oscillation unit 3 works together with a coil 4, which is encapsulated between the two housing parts 2', 2" in such a way that it is separated from the housing interior 2.1. The coil 4 is formed by several turns of a current-carrying electrical conductor. If an alternating electrical signal is applied to the coil, an alternating magnetic field is generated which causes the oscillation unit 3 to oscillate mechanically. As a result of these oscillations, the oscillation unit 3 moves in the horizontal direction as shown in FIG. 3, i.e. alternately towards and away from the water inlet 2a. The oscillation frequency of the oscillation unit 3 can, for example, be in the range between 0.02 Hz and 0.5 Hz, in particular in the range between 0.03 Hz and 0.25 Hz, more preferably between 0.038 Hz and 0.125 Hz. The alternating signal is preferably supplied to the coil 4 via a plug connection 9 provided on the housing 2.

In order to reduce the mass of the oscillation unit 3, it is preferably made of a material that differs from the material of the housing 2. In particular, the material of the oscillation unit 3 has a lower density than the material of the housing 2. For example, the housing is made of cast iron, e.g. GG25. Such a material has good ferromagnetic properties and preferably allows the magnetic field generated by the coil 4 to be concentrated in the area of the housing interior 2.1, in particular in the center of the housing interior 2.1, which offers advantages in the precipitation of calcium carbonate.

The oscillation unit 3 is preferably made of a ferromagnetic plastic material. This allows the mass of the oscillation unit 3 to be considerably reduced, which reduces the mechanical load on the bearing 6 and thus increases the service life of the bearing elements 6.1, 6.2 which cause the bearing 6. The bearing 6 can be provided by any bearing elements 6.1, 6.2, which allow the oscillation unit 3 to be mounted in oscillating fashion. However, a magnetic short-circuit between the housing 2 and the oscillation unit 3 must be effectively avoided. The bearing 6 can preferably have elastomers or spring elements made of stainless steel.

As shown in the sectional view in FIG. 3, the oscillation unit 3 has two projections 3.1, 3.2 protruding from different sides, namely a first projection 3.1 protruding from the oscillation unit center plane SEM towards the water inlet 2a and a second projection 3.2 protruding towards the water outlet 2b. In the oscillation unit center plane SEM, the oscillation unit 3 can be rotationally symmetrical or substantially rotationally symmetrical.

The projections 3.1, 3.2 are hilly or hump-like. Preferably the projections 3.1, 3.2 are centered or substantially centered in relation to the cross-sectional area of the oscillation unit 3. In other words, a connecting line connecting the maxima of the projections 3.1, 3.2 is perpendicular or substantially perpendicular to the oscillation unit center plane SEM.

Preferably the projections 3.1, 3.2 have different heights in relation to the oscillation unit center plane SEM. As shown in FIG. 3, the first projection 3.1 has a height h1 and the second projection 3.2 has a height h2, where h1>h2 applies. The respective height h1, h2 is measured in each case between the oscillation unit center plane SEM and the point of the projection 3.1, 3.2 which is furthest away from this oscillation unit center plane SEM (i.e. the local maximum of the projection).

The size ratio between the heights h1 and h2 can be chosen such that the height h1 is at least 30%, preferably more than 50%, more preferably more than 100% greater than the height h2.

FIG. 3 shows by means of the curved arrows that the water, which flows in the flow direction FR from the water inlet 2a towards the water outlet 2b, flows around the oscillation unit 3. A flow area 5 is formed between the inner wall of the housing 2 and the oscillation unit 3. This flow area 5 has two sections, namely a first flow area section 5.1 extending from the water inlet 2a to the oscillation unit center plane SEM, and a second flow area section 5.2 extending from the oscillation unit center plane SEM to the water outlet 2b.

Due to the aforementioned design of the oscillation unit 3 with the differently shaped projections 3.1, 3.2, the flow area sections 5.1, 5.2 have different flow cross-sections. In particular, the flow cross-section is, at least in some sections, smaller in the flow area section 5.1 than in the flow area section 5.2.

These differences in the flow cross section can also be formed by differently shaped housing parts 2', 2", i.e. alternatively or in addition to the described shaping of the oscillation unit 3, a suitable shaping of the inner walls of the housing parts 2', 2" can affect the described reduction in the flow cross section in the flow area section 5.1.

Due to the smaller flow cross-section in the flow area section 5.1 in comparison to the flow area section 5.2, the flow rate of the water increases from the water inlet 2a to the oscillation unit center plane SEM and is subsequently reduced again on the way from the oscillation unit center plane SEM to the water outlet 2b. This causes a suction or turbulence in the area of the water inlet 2a, which causes local eddying of the water. This results advantageously in the outgassing of carbon dioxide (CO2). This outgassing of carbon dioxide advantageously shifts the position of the lime-carbonic acid equilibrium and thus promotes the precipitation of calcium carbonate microcrystals.

Due to the cross-sectional expansion in the area of the water outlet 2b, a flow calming of the water is also achieved, so that the water leaves the water treatment unit 1 in a laminar flow.

A sensor 7 can be provided for monitoring the function of the water treatment unit 1. This sensor 7 is preferably arranged on the housing 2, in particular in such a way that the sensor 7 or its measuring section determining the measuring information does not protrude into the housing interior 2.1 and thus does not come into contact with the water flowing through the water treatment unit 1. Sensor 7 can in particular be a oscillation sensor, i.e. a sensor the measuring signal of which contains information as to whether or not and to what extent oscillations occur at the water treatment unit 1. The sensor 7, for example, can be a piezoelectric acceleration sensor. It is understood that other sensor types can also be used.

The sensor 7 is preferably connected to an evaluation unit 8, in which the signal provided by sensor 7 is evaluated. In particular, a signal evaluation is carried out to determine how high the oscillation frequency determined by the sensor 7 is. The oscillation frequency is a useful source of information regarding the condition of the water treatment unit 1.

The evaluation unit 8 can preferably be designed to determine whether the oscillation frequency is within a certain desired oscillation frequency range. This desired oscillation frequency range can in particular be defined by a lower oscillation frequency limit value and an upper oscillation frequency limit value. If the oscillation frequency determined by the sensor 7 is within this desired oscillation frequency range, it can be assumed that the water treatment unit 1 operates in normal operation.

If, however, no or only a very low oscillation frequency can be determined, it has to be assumed that the oscillation unit 3 is at least partially blocked, for example by flushed-in particles or by corrosion effects. In addition, a deviation of the oscillation frequency from the desired oscillation frequency range (in particular a post-oscillation of the oscillation unit 3) can indicate that the bearing 6 of the oscillation unit 3 is worn out. Thus, based on the information provided by the evaluation unit 8, specific maintenance work can be initiated on the water treatment unit 1.

Figure 4:
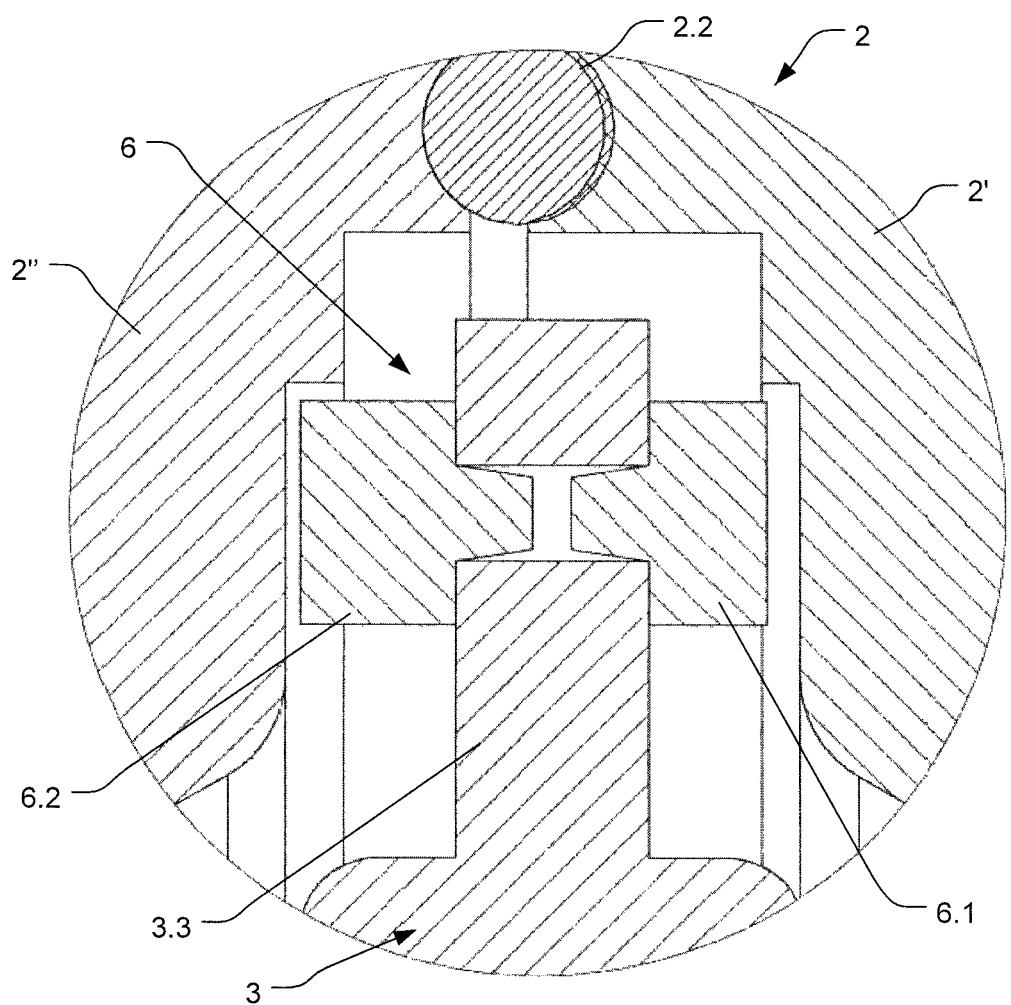
FIG. 4 shows, by way of example, a detail of the bearing of the oscillation unit in the area highlighted in FIG. 3.

FIG. 4 shows a detail of the bearing 6 of the water treatment unit 1, namely of the area which is highlighted in FIG. 3 by the dashed circle. The bearing 6 is preferably mounted pointwise at defined locations on the circumference of the oscillation unit 3.

In the illustrated embodiment, the bearing 6 is formed by a bearing section 3.3 radially projecting from the oscillation unit 3 and a pair of interacting bearing elements 6.1, 6.2. The bearing elements 6.1, 6.2 can, for example, be formed by an elastomer or by spring elements. In the illustrated embodiment, the bearing elements 6.1, 6.2 have projections which face one another and engage in a recess of the bearing section 3.3 of the oscillation unit 3.

As shown in the embodiment according to FIG. 4, the bearing elements 6.1, 6.2 can be asymmetrical, i.e. they differ e.g. in size or elasticity, so that a desired oscillation behavior of the oscillation unit 3 can be achieved.

The invention is described above by means of embodiments. It goes without saying that numerous changes and modifications are possible without abandoning the inventive concept on which the invention is based.

REFERENCE LIST 1 water treatment unit
2 housing
2' first housing part
2" second housing part
2a water inlet
2b water outlet
2.1 housing interior
2.2 seal
3 oscillation unit
3.1 first projection
3.2 second projection
3.3 bearing section
4 coil
5 flow area
5.1 first flow area section
5.2 second flow area section
6 bearing
6.1 first bearing element
6.2 second bearing element
7 sensor
8 evaluation unit
9 plug connection
10, 10a system
11 consumer
12 inlet
13 water heater
14 hot water circulation
FR flow direction
h1 first height
h2 second height
SEM oscillation unit center plane

What is claimed is:

1. A water treatment unit with a housing, comprising:
a housing interior and an oscillating oscillation unit mounted within the housing interior, wherein the oscillation unit is set in oscillation by a coil through which an electrical alternating signal flows,
a water inlet and a water outlet provided on the housing, and a flow area formed between an inner wall of the housing that delimits the housing interior and the oscillation unit, the flow area enables water flowing from the water inlet to the water outlet and enables water flowing around the oscillation unit, wherein the oscillation unit has two projections protruding from different sides, namely a first projection protruding from a center place of the oscillation unit center plane toward the water inlet and a second projection protruding toward the water outlet and wherein the oscillation unit is mounted so as to oscillate in a direction perpendicular to the center plane of the oscillation unit in order to perform an oscillating movement.

2. The water treatment unit according to claim 1, wherein the flow area has a first flow area section adjoining the water inlet in a flow direction and a second flow area section arranged upstream of the water outlet in the flow direction, and wherein a flow cross-section of the second flow area section is at least partially larger than a flow cross-section of the first flow area section.

3. The water treatment unit according to claim 2, wherein a flow cross-sectional tapering of the flow area, which is caused by the first projection facing the water inlet, being greater than a flow cross-sectional tapering caused by the second projection facing the water outlet.

4. The water treatment unit according to claim 3, wherein the first and second projections comprise a hump-like shape with a rounded tip.

5. The water treatment unit according to claim 3, wherein a height of the first projection, measured from a center plane of the oscillation unit, is greater than a height of the second projection that is measured from a center plane of the oscillation unit.

6. The water treatment unit according to claim 1, wherein a material of the oscillation unit has a lower density than a material of the housing.

7. The water treatment unit according to claim 1, wherein the oscillation unit is a ferromagnetic plastic material.

8. The water treatment unit according to claim 1, wherein an oscillation bearing of the oscillation unit is composed of a spring element or an elastomer.

9. The water treatment unit according to claim 1, wherein the oscillation unit is mounted so as to oscillate by asymmetrical beating elements.

10. The water treatment unit according to claim 1, further comprising a sensor for monitoring oscillation of the oscillation unit.

11. The water treatment unit according to claim 10, wherein the sensor is located on the housing and is for a contactless oscillation monitoring of the oscillation unit.

12. The water treatment unit according to claim 10, wherein the sensor is coupled to an evaluation unit, which evaluates an oscillation behavior or an oscillation frequency of the oscillation unit.

13. The water treatment unit according to claim 12, wherein the evaluation unit determines whether oscillation frequency of the oscillation unit is within or outside a desired range of oscillation frequency, whether the oscillation unit performs no oscillation or whether the oscillation behavior of the oscillation unit corresponds to a desired oscillation behavior.

14. A method for treating water by a water treatment unit, the water treatment unit having a housing with an oscillation unit mounted so as to oscillate in a housing interior and a coil, wherein the oscillation unit has two projections protruding from different sides, namely a first projection protruding from a center plane of the oscillation unit toward the water inlet and a second projection protruding toward the water outlet and wherein the oscillation unit is mounted so as to oscillate in a direction perpendicular to the center plane of the oscillation unit in order to perform an oscillating movement, the method comprising the steps of:
applying an alternating electrical signal to the coil, causing the oscillation unit to oscillate mechanically;

passing water through the housing interior of the water treatment unit such that the water flows around the oscillation unit; and precipitating calcium carbonate from the water by the effect of the oscillation unit on the water.

\* \* \* \* \*